Figure 2:
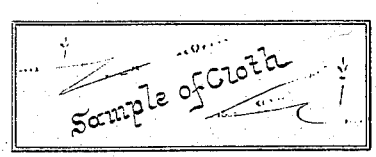

(No Model.)  3 Sheets—Sheet 1.

S. KEMPNER.
STOCK INDICATOR FOR MANUFACTURERS.

No. 271,865.  Patented Feb. 6, 1883.

*Fig. 1.*

(No Model.) 3 Sheets—Sheet 2.

S. KEMPNER.
STOCK INDICATOR FOR MANUFACTURERS.

No. 271,865. Patented Feb. 6, 1883.

(No Model.) 3 Sheets—Sheet 3.

S. KEMPNER.
STOCK INDICATOR FOR MANUFACTURERS.

No. 271,865. Patented Feb. 6, 1883.

*Fig. 3.*

UNITED STATES PATENT OFFICE.

SIMON KEMPNER, OF BUFFALO, NEW YORK.

STOCK-INDICATOR FOR MANUFACTURERS.

SPECIFICATION forming part of Letters Patent No. 271,865, dated February 6, 1883.

Application filed January 12, 1882. (No model.)

*To all whom it may concern:*

Be it known that I, SIMON KEMPNER, of the city of Buffalo, in the county of Erie and State of New York, have invented new and useful Improvements in Stock-Indicators for Manufacturers, &c., of which the following is a specification.

This invention relates to a means for keeping, in a simple manner, a record, in manufacturing and other establishments, of the goods received and sent out, so that the quantity and character of goods on hand can be easily ascertained. In manufacturing establishments in which goods of various sizes and qualities are manufactured it is often very difficult to determine whether goods of a certain size and quality are on hand, and whether material to manufacture the goods called for is on hand. For instance, in clothing-manufactories it often happens that more goods are sold of a certain size and quality than there are on hand, and it becomes necessary to determine whether the goods called for are in course of manufacture or not, and, if so, the quantity which is being manufactured and the amount of material on hand for the further manufacture of goods of the same kind. To obtain correct answers to these inquiries it becomes necessary to examine the stock on hand and the books kept in the different departments of the factory.

The object of my invention is to provide a simple means whereby a record can be kept of all these transactions, and whereby all such inquiries concerning any particular kind of goods are readily answered.

My invention consists, to that end, of an indicator or record of the peculiar construction hereinafter fully set forth.

Figure 3:
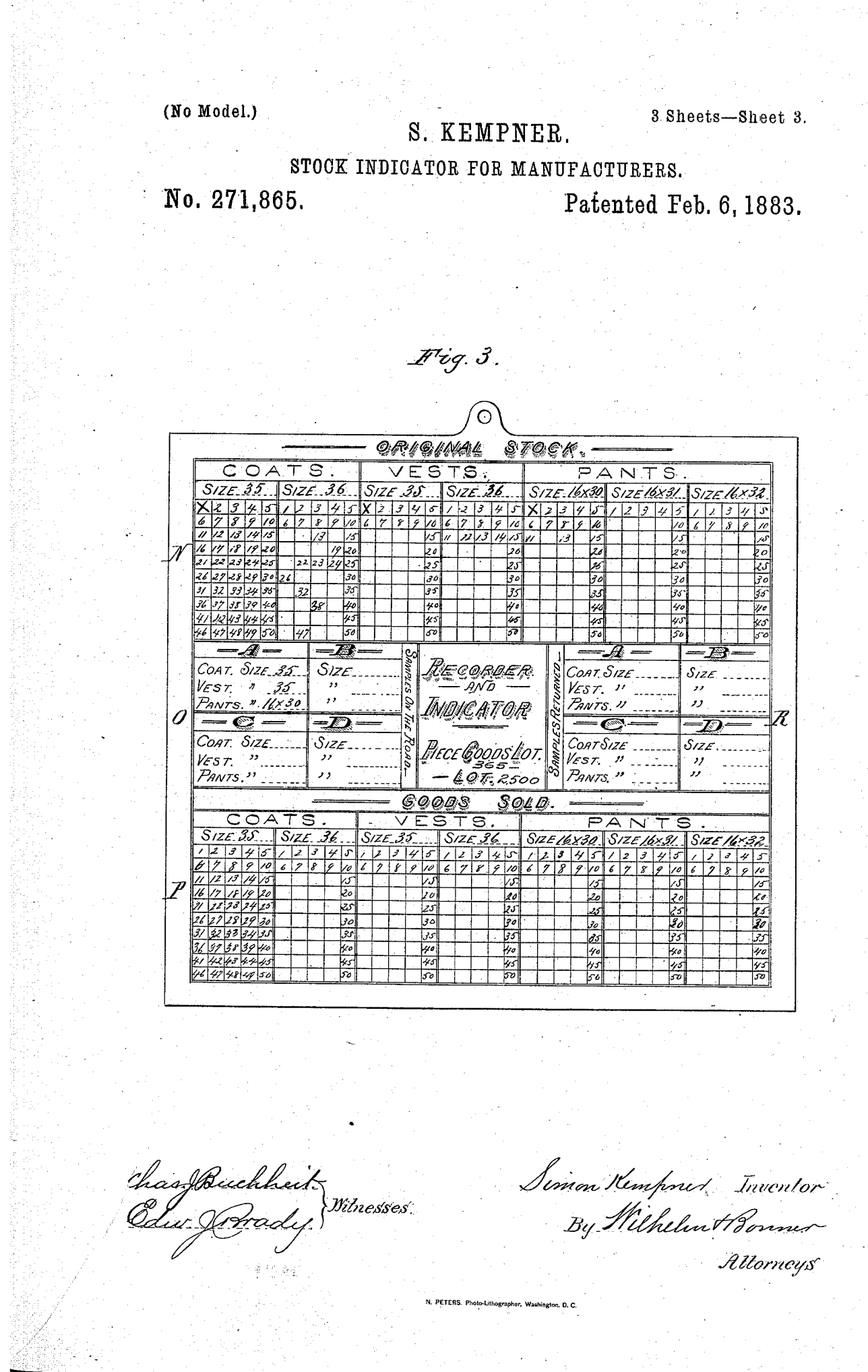

In the accompanying drawings, consisting of three sheets, Figure 1 represents the indicator or record which is kept at the office; Fig. 2, the indicator kept by the foreman; Fig. 3, the indicator kept in the stock-room.

The indicators or records represented by the accompanying drawings are designed for use in a clothing-establishment, and may of course be varied in accordance with the requirements of the business for which they are intended.

The indicator represented in Fig. 1 is intended to be used by the person who has charge of the material from which garments are manufactured, and is provided with a space, A, in which are entered the number of pieces of cloth purchased or ordered, and a space, B, in which are entered the number of pieces of cloth received. Hence a comparison of the entries in the spaces A and B will show whether all the pieces have been received which were ordered of the particular lot to which the indicator relates. This indicator is further provided with a space, C, in which are entered the number of yards of cloth which have been received, a space, D, in which are entered the number of pieces cut, a space, E, in which are entered the number of pieces sold, a space, F, in which are entered the number of yards cut, and a space, G, in which are entered the number of yards sold. Hence a comparison of the entries in the spaces C, F, and G will show at a glance the number of yards which are on hand of this lot, and a comparison of the entries in spaces A and B will show how many more pieces of the same goods, if any, may be expected. An inspection of the entries in space F will also show how many finished garments may be expected of this lot of goods, as the number of garments which can be cut from a given number of yards can be approximately determined by experienced persons. The different lots of piece-goods are distinguished by numbers, letters, or other characters, as indicated on the upper margin of the indicator. The several spaces in which the entries are made are preferably provided with numbers or figures, running from the minimum to the maximum number, which experience shows has to be entered, and the entries are made by crossing out or checking off the number which corresponds with the entry to be made, thereby greatly simplifying the operation of making the entries.

The indicator represented in Fig. 2 is designed to be used by the foreman or other person in charge of the manufacturing-department. It is provided with a space, H, in which are entered the number of pieces cut, a space, I, in which are entered the number of yards cut, a space, K, in which are entered the number of garments cut, a space, L, in which are entered the number of garments in course of manufacture, and a space, M, in which are entered the number of garments finished. The spaces K L M are subdivided for coats, vests, and pantaloons, and the several sizes which are made of each, as clearly shown. This indicator bears the same number, letter, or character which the piece-goods lot bears from which the material is derived, and it bears, in addition, a number or figure distinguishing the ready-made lot which has been produced from such material.

The indicator represented in Fig. 3 is designed to be used by the stock-keeper, and is provided with a space, N, in which are entered the number of garments which were received of that particular lot, and a space, P, in which are entered the number of garments sold, so that a comparison of the entries in the spaces N and P will show at a glance how many garments are contained in the lot. The spaces N and P are subdivided for coats, vests, and pantaloons and the several sizes which are made of each, so that a comparison of these entries will show how many garments of each size are contained in the lot, thereby avoiding the necessity of counting the garments. This stock-indicator bears the same number or letter as the indicator for the ready-made lot, with which it corresponds. This indicator is also provided with a space, O, which is subdivided into as many parts as there are traveling agents or salesmen, and in which are entered the number of garments which each agent has received of the particular lot to which the indicator refers, and a space, R, similarly arranged and subdivided, in which are entered the number of such garments which have been returned by each agent.

The indicators are printed on stiff paper or card-board, and provided with an opening or other means, whereby they can be attached to the lot of goods to which they refer, or the receptacles in which such goods are contained.

By consulting these indicators the number of garments of any given character which are on hand or in course of manufacture, and the quantity of material which is on hand from which the garments in question can be manufactured, can all be readily ascertained. The manner of making the entries is so simple that any person of ordinary intelligence can make these entries, thereby doing away with the necessity of employing skilled book-keepers for the purpose.

I do not desire to claim in this application the particular construction of the indicators represented in Figs. 1 and 2, but which are described and shown for the purpose of more fully explaining the use of the indicator represented in Fig. 3.

I claim as my invention—

1. A stock-room indicator for cloth and clothing provided with spaces N and O for entering the clothing received and sent out, both spaces being subdivided for coats, vests, and pantaloons, and each subdivision being again divided for the different sizes contained in the lot, substantially as set forth.

2. A stock-room indicator provided with a space, N, for entering the goods received, a space, P, for entering the goods sold, a space, O, for entering the goods delivered to agents or traveling salesmen, and a space, R, for entering the goods returned by the same, substantially as set forth.

SIMON KEMPNER.

Witnesses:
 JNO. J. BONNER,
 BEN. KEMPNER.